US007359777B2

(12) United States Patent
Betters et al.

(10) Patent No.: US 7,359,777 B2
(45) Date of Patent: Apr. 15, 2008

(54) SYSTEM AND METHOD OF ANALYZING AIRCRAFT REMOVAL DATA FOR PREVENTATIVE MAINTENANCE

(76) Inventors: W. Bradley Betters, 4061 Turnwood La., Moon Township, PA (US) 15108; Randell W. Livingston, Jr., 1002 St. William Ave., Round Rock, TX (US) 78768; Bob W. Whetsell, 30015 Oakland Hills Dr., Georgetown, TX (US) 78628

( * ) Notice: Subject to any disclaimer, the term of this patent is extended or adjusted under 35 U.S.C. 154(b) by 0 days.

(21) Appl. No.: 11/136,072

(22) Filed: May 24, 2005

(65) Prior Publication Data
US 2006/0047378 A1 Mar. 2, 2006

(51) Int. Cl.
*G01M 17/00* (2006.01)
(52) U.S. Cl. .......................... 701/35; 701/29; 340/438; 340/500; 340/945; 244/75.1
(58) Field of Classification Search .................. 701/29, 701/30, 34, 35; 340/945, 963, 500, 438; 244/75.1; 434/29, 30
See application file for complete search history.

(56) References Cited

U.S. PATENT DOCUMENTS

| 5,359,326 | A | * | 10/1994 | Bivens et al. ................ 340/971 |
| 5,953,707 | A | * | 9/1999 | Huang et al. .................. 705/10 |
| 5,974,349 | A | * | 10/1999 | Levine .......................... 701/29 |
| 6,567,729 | B2 | * | 5/2003 | Betters et al. ................. 701/29 |
| 2002/0039072 | A1 | * | 4/2002 | Gremmert et al. ........... 340/945 |
| 2002/0138184 | A1 | * | 9/2002 | Kipersztok et al. ............ 701/29 |

FOREIGN PATENT DOCUMENTS

EP 0 843 244 A1 5/1998
WO WO 00/55770 A2 9/2000
WO WO 01/15001 A2 3/2001

OTHER PUBLICATIONS

Clinton J T: "The revolution of the aircraft engine ground maintenance station" 2001 IEEE Aerospace Conference Proceedings, vol. 6, (Mar. 20, 2001), pp. 2927-2935.

* cited by examiner

*Primary Examiner*—Gertrude A. Jeanglaude
(74) *Attorney, Agent, or Firm*—Raymond M. Galasso; Galasso & Associates, LP

(57) ABSTRACT

A system includes a computer server for receiving an aircraft dataset; a database operably coupled to the computer server for storing the aircraft dataset into data fields; a web portal operably coupled to the computer server and the database for providing real-time access to consumers; and a maintenance analysis engine coupled to the computer server, the database, and the web portal to process the aircraft dataset into informational reports for an automatic delivery to the consumers, and optionally issuing a notification for retrieval thereof. The system employs a method of analyzing aircraft data for preventative maintenance, comprising: utilizing an aircraft dataset from at least one operational source; parsing the aircraft dataset into at least one data field; determining an acceptable range of values for the aircraft dataset within the at least one data field to define a threshold for the aircraft dataset; automatically activating a dynamic trigger to indicate a maintenance alert when the threshold is crossed; deriving a performance indication for the at least one operational source by determining one or more performance trends of the aircraft dataset; associating with the maintenance alert a notification having a status level indicative of a maintenance condition for the at least one operational source; combining the performance indication and the notification into an electronic report that forecasts need for preventative aircraft maintenance; and automatically delivering the electronic report to a predetermined location for retrieval by a consumer.

17 Claims, 7 Drawing Sheets

CUSTOMER INFORMATIONAL REPORT WEB PAGE

You have a CAUTION level status waiting ...
You have an ALERT level status waiting ...

> Data Communication Systems (ATA Chapter 23):
> 737-400 Fleet - 80 Aircraft
> Data logged: December 1-7, 2000
> Email CAUTION sent : (johndoe@penntex.net)
> 0900z December 7, 2000
> SYSTEM STATUS: RED
> Failure Statistics > 20%
> Problem Description and Analysis
> Contact John Doe at (999) 999-0000

> Heating Air/Cooling System (ATA Chapter 21):
> 767-200 Fleet - 38 Aircraft
> Data logged: December 7, 2000
> Email ALERT sent : (johndoe@penntex.net)
> 1202z December 7, 2000
> SYSTEM STATUS: YELLOW
> Aircraft affected: N627PA, N682PA, N684PA
> Problem Description and Analysis
> Contact John Doe at (999) 999-0000

> APU Monitoring System (ATA Chapter 49):
> 767-200 Fleet - 38 Aircraft
> Data logged: December 6-7, 2000
> SYSTEM STATUS: GREEN

FIG. 7

SYSTEM AND METHOD OF ANALYZING AIRCRAFT REMOVAL DATA FOR PREVENTATIVE MAINTENANCE

TECHNICAL FIELD OF THE INVENTION

The invention relates generally to the field of data processing for supporting a maintenance decision. More particularly, the invention relates to management and analysis of maintenance-related information for trending and reporting performance data from multiple sub-systems or components that are being monitored. Even more particularly, the invention relates to management and analysis of aircraft data so that problems can be predicted and addressed earlier than is possible by using conventional methodology.

BACKGROUND OF THE INVENTION

Oftentimes, a maintenance process encompasses retrieval, analysis and dissemination of appropriate information to enable decision making regarding preventative maintenance and thus, preempting avoidable repairs or delays. However, such processing typically involves a predominantly manual management and analysis of the maintenance-related information and subsequent distribution of the maintenance decision support information. Because of the inherent delay associated with the predominantly manual maintenance process, under these circumstances, a variety of problems such as, but not limited to, increased maintenance cost and reduced operational efficiency may result. Even worse, these maintenance-related problems could become exacerbated as the complexities increase.

More specifically, a maintenance process of highly complex machines such as air-borne vehicles is complicated, as the amount and type of the maintenance-related information collected from disparate sources is significantly large. In addition, appropriate processing of such maintenance-related information to derive a maintenance decision can be a daunting task. For instance, in an aircraft operation, multiple aircraft systems are constantly monitored by flight data acquisition systems to acquire maintenance-related information. The Air Transport Association (ATA) has categorized the monitored aircraft systems in different groups. Such monitored aircraft systems generally include Air Conditioning, Auto Flight, Communications, Fire Protection, Flight Controls, Fuel, Hydraulic Power, Indicating/Recording System, Landing Gear, Navigation, Oxygen, Pneumatic, Onboard Maintenance, Informational, Airborne Auxiliary Power, and Stabilizer. As these aircraft systems are monitored, aircraft data associated therewith, often referred to as "removal or component data" can be readily collected via a variety of data transfer techniques, including but not limited to, Flight Data Recorders (FDRs), Tape and Optical Disk Recovery, Digital Media Recovery (i.e. PCMCIA cards), Aircraft Communications and Reporting Systems (ACARs), VHF Digital Air to Ground Communications (VDLM2), Satellite Air to Ground Data Communications (SATCOM) High Frequency Air to Ground Wireless Data Communication Links (HFDL), and/or Wireless Ground Data Communication Links (GDL).

A typical aircraft maintenance process, for example, for a regularly scheduled service generally entails a manual analysis of maintenance-related information such as aircraft data, often referred to as "maintenance analysis," which may include manually examining the contents of the aircraft data associated with a particular component of an aircraft. By manually analyzing the aircraft data, a maintenance decision for that particular component of the aircraft may be derived. Contents of the maintenance decision, including maintenance decision support information, may be manually disseminated accordingly. As the maintenance must be completed under certain constraints, a suitable form of communication to disseminate this maintenance decision support information may be employed to issue warnings or recommend repair procedures in response to the maintenance-related information.

In this manner, to perform the maintenance analysis of the aircraft data, a subs system or a component of an aircraft may be first closely monitored for a predetermined period of time. For example, a data acquisition and analysis system may acquire the aircraft data from multiple onboard sources and analyze the aircraft data to identify symptoms to determine the sub-system or the component operational failures, faults, events for providing maintenance-related information. The maintenance-related information provided by this system can enable the aircraft operators to reduce unscheduled mechanical delays and flight cancellations, thereby reducing bottom line costs.

Unfortunately, management and analysis of maintenance-related information for real-time trending and reporting performance data from one or more sub-systems or components can be difficult. Providing proactive maintenance analysis to minimize reactive maintenance could be even more difficult, as most operators fail to properly utilize the aircraft data for this purpose. Thus, accurate or specific decision support information for maintenance may not be provided prior to the occurrence of maintenance-related problems. Therefore, the operators may not, under these circumstances, benefit from the informational analysis of the maintenance-related information. Accordingly, a suitable transformation of the maintenance-related information is desirable that provides meaningful maintenance decision support information for performing proactive maintenance. Thus, an improved system and method for supporting maintenance decision is desired in the art.

Heretofore, the requirements of providing more proactive maintenance analysis and real-time reporting of a maintenance decision support information, in a manner without compromising accuracy referred to above have not been fully met. What is needed is a solution that simultaneously addresses all of these requirements.

SUMMARY OF THE INVENTION

The present invention generally provides a system and method of analyzing aircraft removal data for preventative maintenance. In one exemplary embodiment, a computer-implemented method of analyzing aircraft data for preventative maintenance, comprising: utilizing an aircraft dataset from at least one operational source; parsing the aircraft dataset into at least one data field; determining an acceptable range of values for the aircraft dataset within the at least one data field to define a threshold for the aircraft dataset; automatically activating a dynamic trigger to indicate a maintenance alert when the threshold is crossed; deriving a performance indication for the at least one operational source by determining one or more performance trends of the aircraft dataset; associating with the maintenance alert a notification having a status level indicative of a maintenance condition for the at least one operational source; combining the performance indication and the notification into an electronic report that forecasts need for preventative aircraft maintenance; and automatically delivering the electronic report to a predetermined location for retrieval by a consumer.

Another embodiment of the invention is based on an electronic media, comprising a program for performing this method. Another embodiment of the invention is based on a computer program, comprising computer or machine readable program elements translatable for implementing this method.

In one another embodiment of the present invention, a method of providing maintenance support, comprising: parsing a maintenance information dataset from at least one operational source into at least one data field to derive an active dataset; setting a trigger having a first limit and a second limit for the at least one data field; analyzing the active dataset for selectively activating the trigger in response to an excursion of the active dataset beyond one of the first limit or the second limit within the at least one data field; associating with the trigger a status indication; processing the active dataset to derive one or more trends for the at least one data field; and transforming the status indication and the one or more trends into a preventative maintenance report for the at least one operational source.

In yet another embodiment of the present invention, a computer-implemented method of analyzing aircraft data for preventative maintenance, comprising: parsing a dataset indicative of maintenance-related information associated with an operational source into a data field; setting a limit on the data field to assess the dataset; activating a trigger in response to an excursion of the dataset beyond the limit; associating with the trigger a status indication; processing the dataset from the data field to derive trend information indicative of performance of the operational source; and presenting the status indication and the trend information into an informational report.

In an alternate embodiment, the present invention provides maintenance support to a user, comprising: utilizing a maintenance information dataset associated with an aircraft operational source to derive an active dataset in response to a user provided an analysis criteria, the analysis criteria including a predetermined period of time over which the maintenance information dataset is collected by monitoring the aircraft operational source; parsing the active dataset into at least one data field; setting a trigger having a first limit and a second limit for the at least one data field, the trigger is determined responsive to an external profile having a first input, a second input, and a third input; analyzing the active dataset for selectively flagging the at least one data field by activating the trigger in response to a predetermined amount of excursion of the active dataset within the at least one data field beyond one of the first limit or the second limit; associating with the predetermined amount of excursion a status indication having a first level, a second level and a third level, either the first level, the second level or the third level is selected based on the predetermined amount of excursion beyond one of the first limit and the second limit, respectively; processing the predetermined amount of excursion of the active dataset to derive one or more specific trends for the at least one data field; transforming the status indication and the one or more specific trends into a preventative maintenance report; delivering the preventative maintenance report with the status indication to the user, and alerting the user by issuing a notification concerning the delivery of the preventative maintenance report.

In still another embodiment of the present invention, a system including, a computer server for receiving an aircraft dataset from a plurality of operational sources to parse the aircraft dataset into a plurality of data fields; a database operably coupled to the computer server for storing the aircraft dataset into the plurality of data fields; a web portal operably coupled to the computer server and the database, the web portal being accessible to a plurality of consumers employing one or more Internet connections for accessing a maintenance-related informational report through a user interface associated with each of plurality of consumers, the user interface providing real-time access, by way of a computer network, to the maintenance-related informational report; and a maintenance analysis engine coupled to the computer server, the database, and the web portal for processing the plurality of data fields by setting a dynamic limit on one or more data fields of the plurality of data fields, and disseminating one or more proactive recommendations through the web portal, the one or more recommendations being derived from a performance trending indication of the aircraft data stored in the database by dynamically flagging the one or more data fields when the dynamic limit is reached.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

These, and other, aspects of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

The drawings accompanying and forming part of this specification are included to depict certain aspects of the invention. A clear conception of the advantages and features constituting the invention, and of the components and operation of systems provided with the invention, will become more readily apparent by referring to the exemplary, and therefore non-limiting, embodiments illustrated in the drawings, wherein like reference numerals (if they occur in more than one view) designate the same elements. The invention may be better understood by reference to one or more of these drawings in combination with the description presented herein. It should be noted that the features illustrated in the drawings are not necessarily drawn to scale.

FIG. 7 shows an exemplary customer informational report web page obtained from executing the AIMM application software of FIG. 6 on the system of FIG. 5 in accordance with one aspect of the present invention.

DETAILED DESCRIPTION

The invention and the various features and advantageous details thereof are explained more fully with reference to the non-limiting embodiments that are illustrated in the accompanying drawings and detailed in the following description. Descriptions of well-known components and processing techniques are omitted so as not to unnecessarily obscure the invention in detail.

Overview

Figure 1:
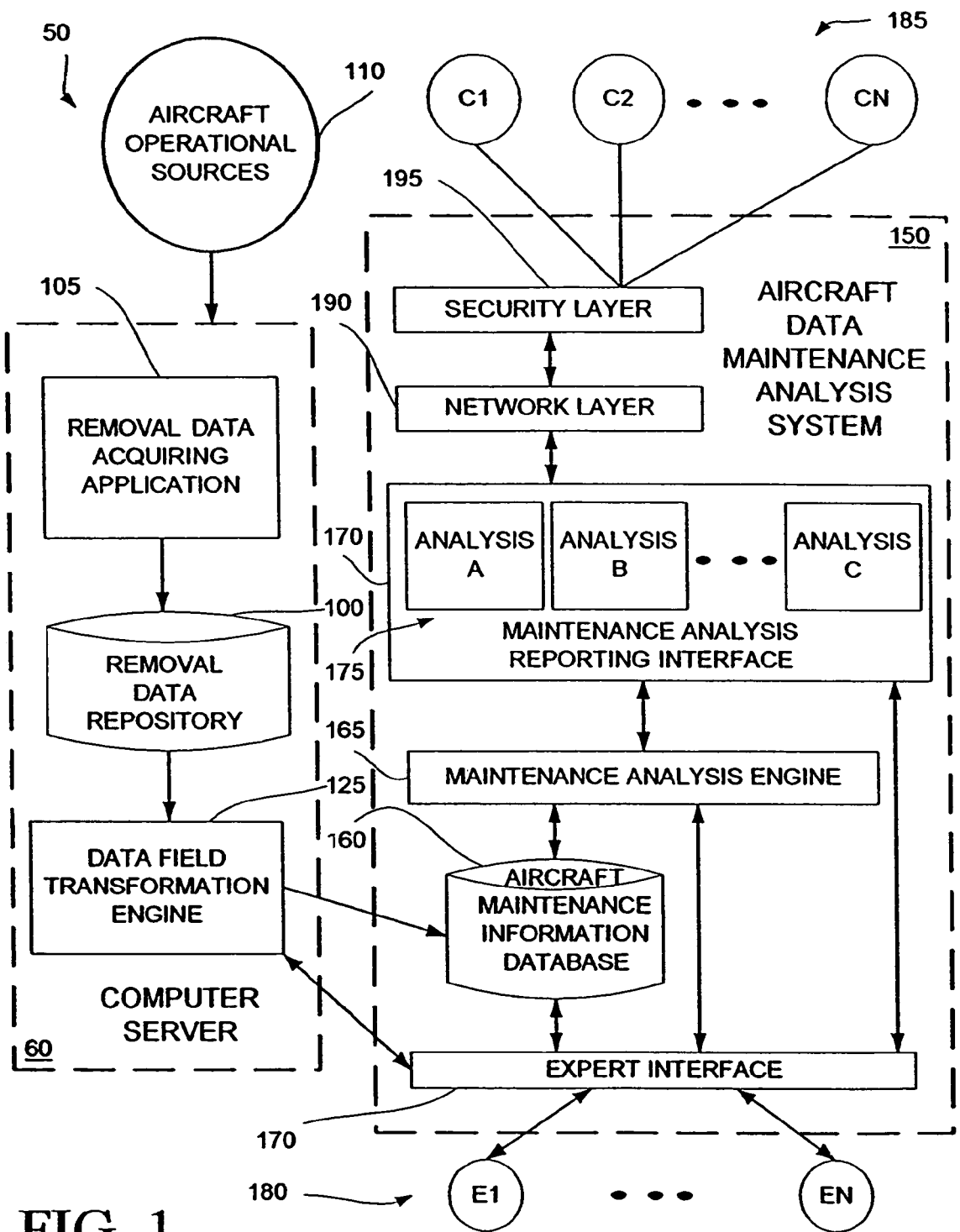
FIG. 1 illustrates but an overview of one embodiment of the present invention as a data processing system.

FIG. 1 illustrates but an overview of one embodiment of the present invention as a data processing system 50. In an exemplary embodiment, data processing system 50 may include a computer server 60. Computer server 60 may include a user-operated aircraft data repository 100, which may be accessed through a removal data acquiring application 105 by a trained user for collecting removal data from a variety of aircraft operational sources 10. For example, disparate aircraft systems may be monitored to gather desired removal data either form one or a fleet of aircrafts utilizing one or more well-established aircraft data recording methods.

Computer server 60 may further include a data field transformation engine 125 for parsing the removal data into multiple data fields responsive to an expert defined first criteria. For example, the expert defined first criteria may include a dataset selection criterion and a custom format criterion.

In particular, data field transformation engine 125 generally provides for transforming of information or data contained in user-operated aircraft data repository 100 to an aircraft data maintenance analysis system 150 comprising an aircraft maintenance information database 160. Aircraft maintenance information database 160 stores the parsed removal data into the multiple data fields. In one embodiment consistent with the present invention, the removal data in aircraft maintenance information database 160 may be generally signed to form interactive data fields. Such interactive data fields are organized to facilitate the efficient search and retrieval of information most pertinent to a maintenance analysis session for which the aircraft maintenance information database 160 is employed.

Aircraft data maintenance analysis system 150 further includes a maintenance analysis engine 165. While maintenance analysis engine 165 is included to analyze the removal data for preventative maintenance, a maintenance analysis reporting interface 170 is incorporated to disseminate a plurality of analyses 175 such as Analysis A, Analysis B, and Analysis C to a desired audience. In addition, an expert interface 170 may be operably coupled to aircraft maintenance information database 160, data field transformation engine 125, maintenance analysis engine 165, and maintenance analysis reporting interface 170 for providing an interactive access to a plurality of experts 180.

Expert interface 170 may include a set of instructions to carry out the expert defined first criteria from the plurality of experts 180. For example, expert interface 170 may include a graphical user interface having an input template or a command line operated interface. Maintenance analysis engine 165 may generally execute data field transformation engine 125 to realize the first criteria functionality.

Preferably, the plurality of experts 180 comprises a diverse group of technical processionals associated with the aircraft industry, as well as aircraft operators, technicians and engineers. Furthermore, with each authorized expert 180 having access to the aircraft data maintenance analysis system 150 from a remote location by way of a computer using a keyboard and a video monitor, thereby enabling dynamic response to aircraft maintenance whether preventative or otherwise.

In an exemplary embodiment, a video display comprising data entry fields, point-and-click icons, and navigational controls is accessible at a web site by way of a plurality of Internet connections to the remote locations of experts 180. An expert 180 may select from a plurality of displays a desired set of data entry fields for requesting information either from computer server 60 and/or aircraft data maintenance analysis system 150, and view a display of requested information retrieved from user-operated aircraft data repository 100 and/or aircraft maintenance information database 160.

Typically, the system implementation of user-operated aircraft data repository 100 and removal data acquiring application 105 can be readily devised to be compatible with the needs of a diverse plurality of consumers 185 for distributing plurality of analyses 175. Because of system incompatibilities, disparate data organization methodologies and varying security requirements, appropriate network and security requirements may be provided through a network layer 190 and a security layer 195.

In one exemplary implementation, network layer 190 and security layer 195 could be readily customized to satisfy the information access requirements of diverse plurality of consumers 185 for which plurality of analyses 175 are created. For example, the present invention also may provide for customization of the network layer 190 that enables connectivity to one or more access locations. Such connectivity may be a plurality of Internet connections, dedicated wire line connections, and similar connection arrangements. The network layer 190 may therefore serve multiple connections by way of the Internet, as well as local area networks, wide area networks, virtual private networks, and other network types.

As an example, the present invention also may provide for a customization of security layer 195 to prevent unauthorized access to information. Thus, access to information in maintenance analysis reporting interface 170 could be controlled to exclude access to sensitive information by individuals who have no authorization to access the sensitive information.

As persons skilled in the art will appreciate that data processing system 50 could be readily devised for a particular operating platform employing suitable programming tools. For example, one or more compatible high level programming languages such as BASIC, C, C++, Java, mainframe languages such as EBCDIC, COBOL or visual programming languages such as Vbasic may be advantageously employed for a specific operating platform including legacy platforms such as for an IBM mainframe operating system from International Business Machines Corporation, Armonk, N.Y. It is to be understood that data field transformation engine 125 and maintenance analysis engine 165 could be readily devised for a particular operating platform employing suitable programming tools as generally utilized to synthesize data processing system 50.

EXEMPLARY EMBODIMENTS

It should be understood, however, that the detailed description and the specific exemplary embodiments, while indicating preferred embodiments of the invention are given by way of illustration only and not by way of limitation. Various additions, changes and modifications within the spirit and scope of the underlying inventive concept will become apparent to those skilled in the art from the detailed description.

Figure 2:
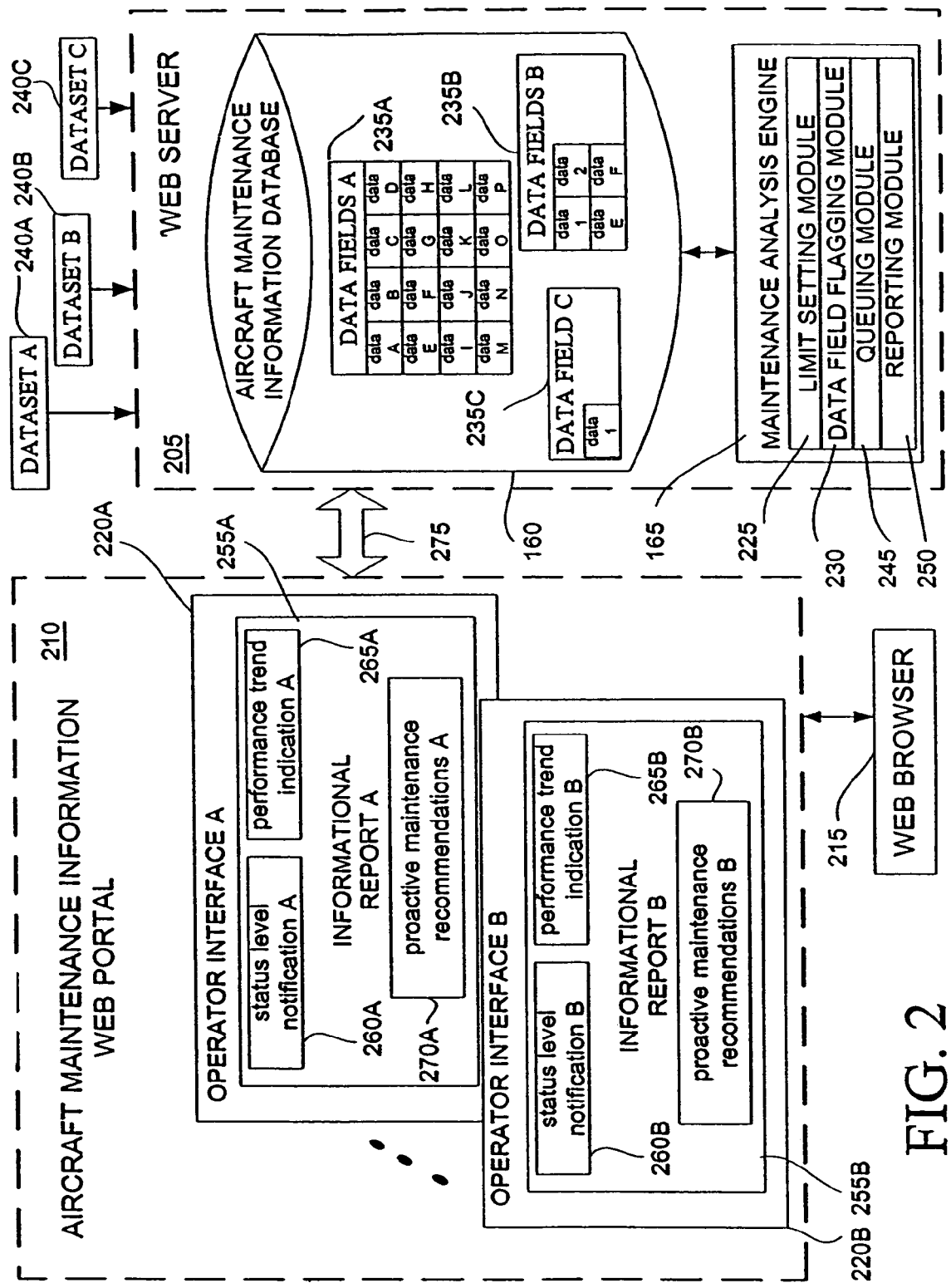
FIG. 2 shows an exemplary implementation of the one embodiment of FIG. 1.

FIG. 2 depicts an exemplary implementation of the one embodiment of FIG. 1. With reference to FIGS. 1 and 2, for the depicted exemplary implementation, a web server 205 may employ the maintenance analysis engine 165 for operating on aircraft maintenance information database 160 to enable a maintenance analysis process for deriving preventative maintenance conclusions. To report such preventative maintenance conclusions obtained from such maintenance analysis process, web server 205 utilizes an aircraft maintenance information web portal 210 that may be remotely accessed over a computer or communication network including, but not limited to World Wide Web or Internet.

As shown in FIG. 2, the aircraft maintenance information web portal 210 may be executed under control of a web browser 215 by the plurality of consumers 185 (not shown). Using operator interfaces 220A and 220B, such as operator interface A and operator interface B, respectively, the preventative maintenance conclusions may be distributed in real-time to the plurality of consumers 185 via the aircraft maintenance information web portal 210.

In particular, maintenance analysis engine 165 includes one or more software modules for performing the maintenance analysis process. In one embodiment, a limit setting module 225 is incorporated for dynamic limit setting on any data field that has been parsed. In addition, maintenance analysis engine 165 may include a data field flagging module 230 for allowing dynamic flagging of data fields 235A through 235C with datasets 240A through 240C, respectively. Moreover, maintenance analysis engine 165 may include a queuing module 245 that provides a quality audit queuing of limit setting for management approval. Furthermore, the queuing module may provide a quality audit queuing of informational report submittal for management approval. Finally, maintenance analysis engine 165 may include a reporting module 250 for preparation of informational reports 255A and 255B, such as informational report A and informational report B. Reporting module 250 delivers the preventative maintenance conclusions to appropriate operator interface A and/or operator interface B in aircraft maintenance information web portal 210. Each informational report 255 may comprise a respective status level information and performance trend information.

More specifically, informational report A, 255A comprises a status level notification A, 260A, a performance trend indication A, 265A, and proactive maintenance recommendations A, 270A. Likewise, informational report B, 255B comprises a status level notification B, 260B, a performance trend indication B, 265B, and proactive maintenance recommendations B, 270B. Optionally, the reporting module 250 may issue an electronic notification such as an email message or electronic page for a maintenance condition alert to a particular consumer among the plurality of consumers 185, in response to the status level notification 260 meeting a predefined criteria.

In operation, web server 205 may receive a parsed portion of the removal data from associated datasets 235A through 235C, as examples, Dataset A 235A, Dataset B 235B, and Dataset C 235C in respective data fields 240A through 240C such as Data fields A 240A, Data fields B 240B, and Data field C 240C. Informational reports 255A and 255B may be generally created through maintenance analysis engine 165, responsive to an expert defined second criteria or set of rules.

Aircraft maintenance information web portal 210 may receive the informational reports 255A and 255B through a communication channel 275 generally unitizing a communication protocol. A variety of such communication protocols are known. One communication protocol that may be deployed is Hyper Text Transport Protocol (HTTP). Other communication protocols are known to those of skill in the art.

In one exemplary embodiment, using Hyper Text Markup Language (HTML), web browser 215 displays informational reports 255A and 255B via operator interfaces 220A and 220B at aircraft maintenance information web portal 210. Furthermore, web server 205 operates on aircraft maintenance information database 160 including, but not limited to a DB2 database or a DB2 for OS/390 subsystem that are on the same machine or on different machines in a distributed network. Relational or non-relational removal data can be stored, accessed and/or updated, using database products such as Microsoft SQL Server and Sybase SQL Server to enable manipulation of the datasets 235A through 235C within data fields 240A through 240C.

Figure 3:
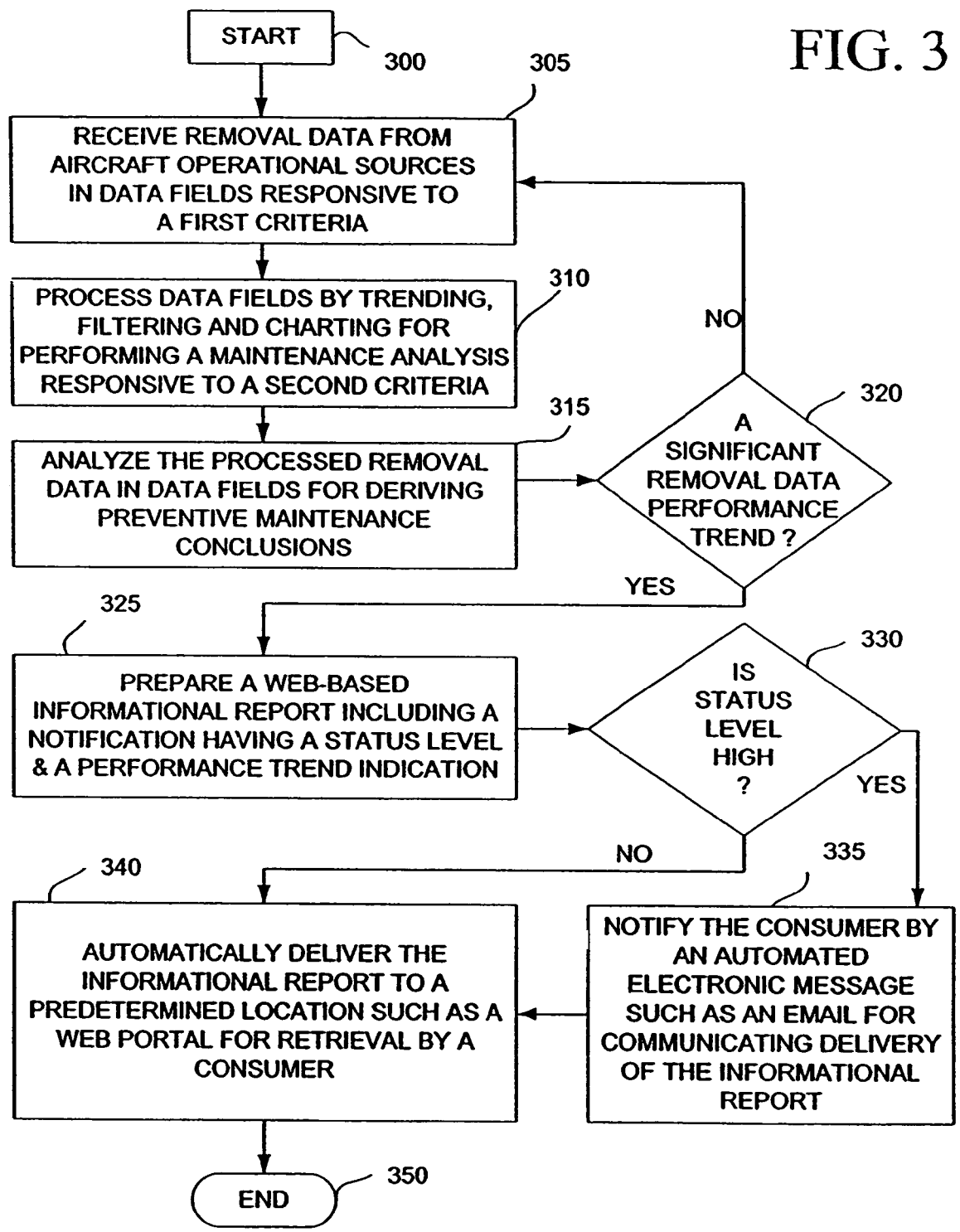
FIG. 3 depicts a flow chart of exemplary steps embodying a maintenance analysis routine in accordance with one aspect of the present invention.

FIG. 3 depicts a flow chart of exemplary steps embodying a maintenance analysis routine in accordance with one aspect of the present invention. With reference to FIGS. 1, 2 and 3, in step 300, the maintenance analysis routine is initialized. In step 305, for example, an expert 180 may specify a first criteria including a data transformation criterion for extracting appropriate removal data from removal data repository 100 to aircraft maintenance information database 160 as one or more particular datasets 235A through 235C within data fields 240A through 240C. Alternatively, a pre-entered first criteria may be automatically utilized by management analysis engine 165.

In step 310, for example, an expert 180 may specify a second criteria including a trending criterion, a filtering criterion, and/or a charting criterion to management analysis engine 165 for processing data fields 240A through 240C to perform a maintenance analysis. Alternatively, a pre-entered second criteria may be automatically utilized by management analysis engine 165.

In step 315, management analysis engine 165 generally executes on web server 205. Accessing aircraft maintenance information database 160, management analysis engine 165 derives one or more performance trends. In particular, management analysis engine 165 determines the one or more performance trends responsive to the second criteria specified in step 310. Alternatively, in step 315, for example, an expert 180 may manually analyze the removal data within data fields 240A through 240C for deriving preventative maintenance conclusions including, but not limited to the one or more performance trends.

In step 320, a trend test may be performed on the one or more performance trends to identify a significant removal data performance trend If the trend test is affirmative, the management analysis routine may proceed to step 325. Conversely, if no significant removal data performance trend is identified, the management analysis routine returns to step 305.

A web-based informational report may be prepared at step 325. Such web-based informational report may comprise a notification having a status level and a performance trend indication. A status level test may be performed in step 330 to determine if status level is high. If the status level test is affirmative the management analysis process may proceed to step 335. Conversely, if the status level is low, step 335 may be skipped and the management analysis routine may proceed directly to step 340. In step 340, the web-based informational report may be automatically delivered to a predetermined location such as the web portal 210 for retrieval by a consumer 185. In step 335, the consumer 185 may be notified by an automated electronic message such as an email for communicating delivery of the web-based informational report. At step 350 the management analysis routine may end and wait for a next cycle of the management analysis to begin.

Figure 4:
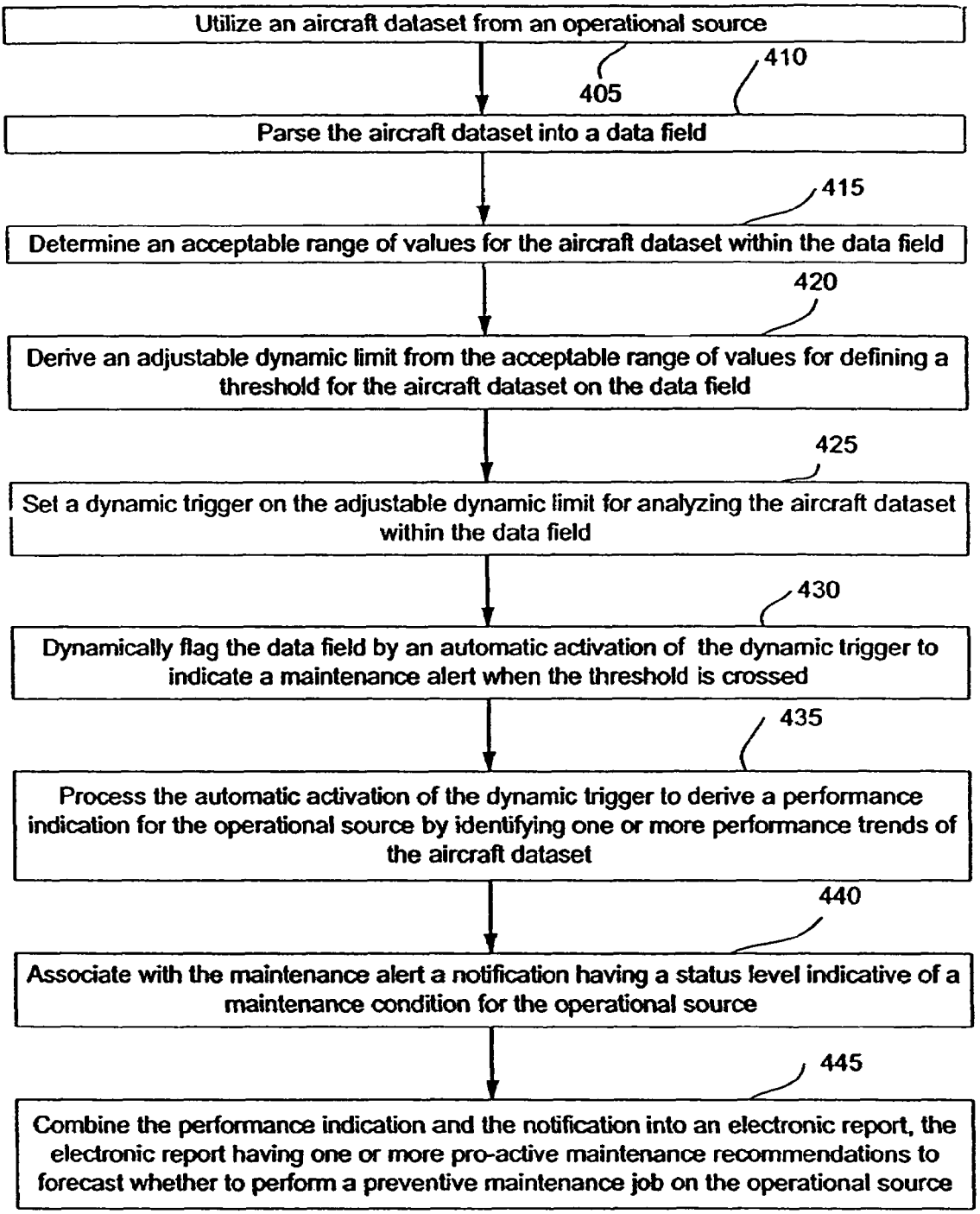
FIG. 4 shows a flow chart with exemplary details, consistent with one aspect of the present invention, embodying a portion of a maintenance analysis process of FIG. 3.

FIG. 4 shows a flow chart with exemplary details, consistent with one aspect of the present invention, embodying a portion of the maintenance analysis routine of FIG. 3. Referring to FIGS. 3 and 4, in step 405, an aircraft dataset, such as Datatset A, 240A may be utilized for analyzing removal data from at least one operational source, such as one from the aircraft operational sources 110 to perform preventative maintenance. Next at step 410, the aircraft dataset may be parsed into at least one data field. In step 415, an acceptable range of values for the aircraft dataset within the data field may be determined. Then, in step 420, an adjustable dynamic limit may be derived from the acceptable range of values for defining a threshold for the aircraft dataset on the data field. A dynamic trigger may be set on the adjustable dynamic limit, in step 425, for analyzing the aircraft dataset within the data field. The data field may be dynamically flagged by an automatic activation of the dynamic trigger to indicate a maintenance alert when the threshold is crossed, in step 430.

In step 435, the automatic activation of the dynamic trigger may be processed to derive a performance indication, such as the performance trend indication A, 265A for the operational source by identifying one or more performance trends of the aircraft dataset At step 440, the maintenance alert may be associated with a notification having a status level, such as the status level notification A, 260A indicative of a maintenance condition for the operational source. The performance indication and the notification may be combined into an electronic report, such as the informational report A, 255A, in step 445. The electronic report may include one or more proactive maintenance recommendations to forecast whether to perform a preventative maintenance job on the operational source. Further, the electronic report may be automatically delivered to a predetermined location, such as the operator interface A, 220A of the aircraft maintenance information web portal 210 for retrieval by a consumer 185. And, selectively the consumer 185 may be notified by an automated electronic message based on the status level of the notification. The automated electronic message communicates delivery of the electronic report for the consumer 185 to the predetermined location.

Prior to the act of utilizing the aircraft dataset the aircraft dataset may be collected form the operational source, in response to a first criteria provided for a maintenance analysis. In one exemplary embodiment, a consumer 185 provides the first criteria including a predetermined period of time over which the aircraft dataset is to be collected by monitoring the operational source. The dynamic trigger may be determined responsive to a second criteria including an external profile from an expert 180. The external profile could include a plurality of input attributes indicative of the maintenance analysis for the aircraft dataset at issue. In addition, as the status level may include different levels such as a green level, a yellow level, and a red level. A particular level may be selected based on a predetermined excursion of the aircraft dataset in the data field beyond the adjustable dynamic limit, and the external profile.

Moreover, the predetermined location can include a web site dedicated for the consumer 185, and the web site may be controllably accessed by the consumer 185 via Internet 505. Additionally, the web site may be generally employed for disseminating to the consumer, among other things, the one or more proactive maintenance recommendations, such as the proactive maintenance recommendations A, 270A. In one embodiment, at least one of such one or more proactive maintenance recommendations includes an incentive associated with the at least one operational source, whereby the incentive encourages the consumer 185 to consider carrying out the preventative maintenance job on the operational source. The electronic report may further comprise a maintenance problem description and analysis for the operational source.

Figure 5:
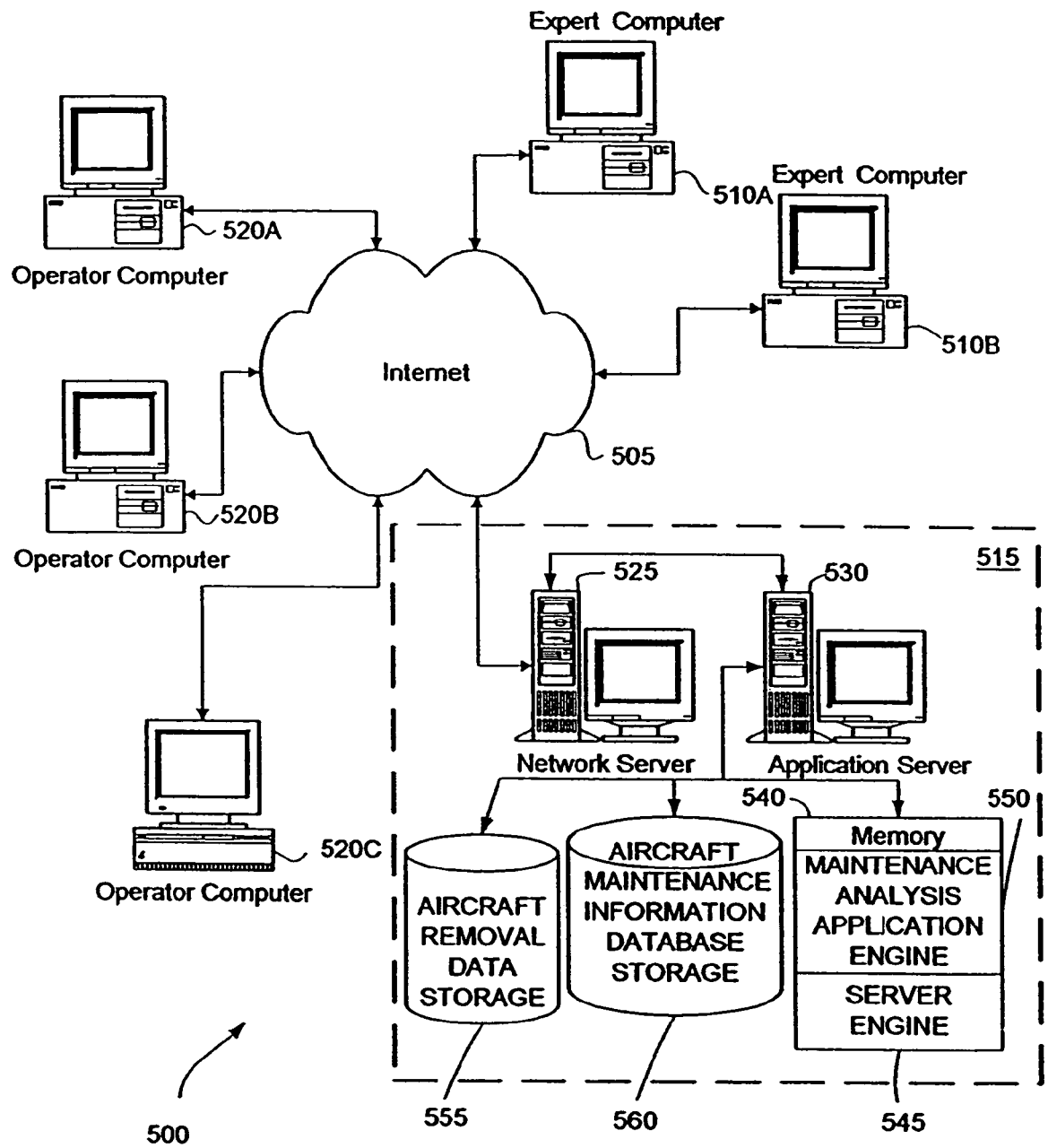
FIG. 5 shows exemplary hardware/software components in a system for analyzing aircraft data for preventative maintenance using Internet according to one aspect of the present invention.

FIG. 5 shows exemplary hardware/software components in a system 500 for analyzing aircraft removal data for preventative maintenance using Internet-505 according to one aspect of the present invention. With reference to FIGS. 1 through 5, an expert 180 (not shown) may use a first computer, such as an IBM compatible computer 510A or 510B, to request over a computer network, such as the Internet 505, a criteria template from an Internet computer server 515 that preferably services multiple operators or consumers 185 (not shown) though a second computer, such as an IBM compatible computer 520A, or 520B or a Macintosh personal computer 520C.

Experts 180 (not shown) can request a blank template for creating a first criteria template or use a previously created criteria template for transforming selected aircraft removal data as datasets 235A through 235C from removal data repository 100 to aircraft maintenance information database 160 within data fields 240A through 240C. The experts 180 may use a second criteria template to define the process illustrated in steps 300 through 350 and steps 405 through 445, which specifies a maintenance analysis process for web server 205 to operate aircraft maintenance information web portal 210.

Internet computer server 515 may include a network server 525, such as a Sun Solaris UltraSpare Server, executing communications software, such as Apache HTTPD Server from The Apache Group, www.apache.org, to communicate over computer network including Internet 505. Also, at the Internet computer server 515 may be an applications server 530, preferably operating behind a firewall, in data communications with network server 525 and having a memory 540 that contains software used in the present invention, including a server engine 545, for generating and processing templates, and a maintenance analysis application engine 550 in data communications with applications server 530. Internet computer server 515 may be operably coupled to an aircraft removal data storage 555 and an aircraft maintenance information database storage 560. The software operating on the applications server 530 and network server 525 communicate with each other and with necessary databases using standard protocols, such as CGI or Apache API. Skilled persons will understand that additional or different servers may be suitably deployed.

Operators such as consumers 185 could be part of a single enterprise and connected to Internet computer server 515 over a local area network, a wide area network, an Extranet or an Intranet. Alternatively, Internet computer server 515 could service many unrelated operators or consumers 185, each having appropriate access to the content of aircraft removal data storage 555 and/or aircraft maintenance information database storage 560 that are being accessible through Internet computer server 515 while connected to Internet 505. Typically, many operators or consumers 185 could continually accessing in real-time informational reports that are being posted over the computer network such as Internet 505, optionally by the experts 180.

In an alternate embodiment, the present invention provides a maintenance decision support to a user. Utilizing a dataset, such as the Dataset A, 240A, indicative of maintenance information associated with an operational source, such as one form the aircraft operational sources 110, an active dataset is derived. In response to an analysis criteria, a predetermined period of time over which the dataset is collected by monitoring the operational source. The user may provide the analysis criteria to parse the active dataset into at least one data field, such as the Data field A, 235A. By creating a trigger having a first limit and a second limit for the data field may be set. The trigger is determined responsive to an external profile having a first input, a second input, and a third input. Then the active dataset is analyzed by selectively flagging the data field. Next, the trigger is activated, in response to a predetermined amount of excursion of the active dataset within the data field beyond one of the first limit or the second limit.

Associating with the predetermined amount of excursion, a status indication, such as the status level notification A, 260A may comprise a first level, a second level and a third level that indicates the degree of maintenance-related concern regarding the operational source. The particular level is selected based on the predetermined amount of excursion beyond one of the first limit and the second limit, respectively.

Next, by processing the predetermined amount of excursion of the active dataset, for the data field, one or more specific trends are derived within the performance-trend indication A, 265A. Then the status indication and the one or more specific trends are transformed into a report within the informational report A, 255A. Preferably, the report may comprise an informational content and a form indicative of the maintenance decision support for the operational source.

Finally, the report with the status indication may be delivered to the user, and optionally, issuing a notification concerning the delivery of the report may alert the user. The report could include a maintenance problem description and analysis thereof for use to arrive at a decision for maintenance of the operational source.

The term connected, coupled, or operably coupled as used herein, is defined as connected, although not necessarily directly, and not necessarily mechanically. The term engine, routine, interface, program, software or phrase computer program or software module, as used herein, is defined as a sequence of instructions or code designed for execution on an electronic machine such as a computer or computing device and/or system. For example, a program may include a subroutine, a function, a procedure, an object method, an object implementation, an executable application, an applet, a servlet, a source code, an object code, and/or other sequence of instructions or code advantageously designed for execution on a computer system.

EXAMPLE

Specific embodiments of the invention will now be further described by the following, non-limiting example which will serve to illustrate in some detail various features of significance. The following example is intended merely to facilitate an understanding of ways in which the invention may be practiced and to further enable those of skill in the art to practice the invention. However, it should be appreciated that many changes can be made in the exemplary embodiments which are disclosed while still obtaining like or similar result without departing from the spirit and scope of the invention. Accordingly, the example should not be construed as limiting the scope of the invention.

Figure 6:
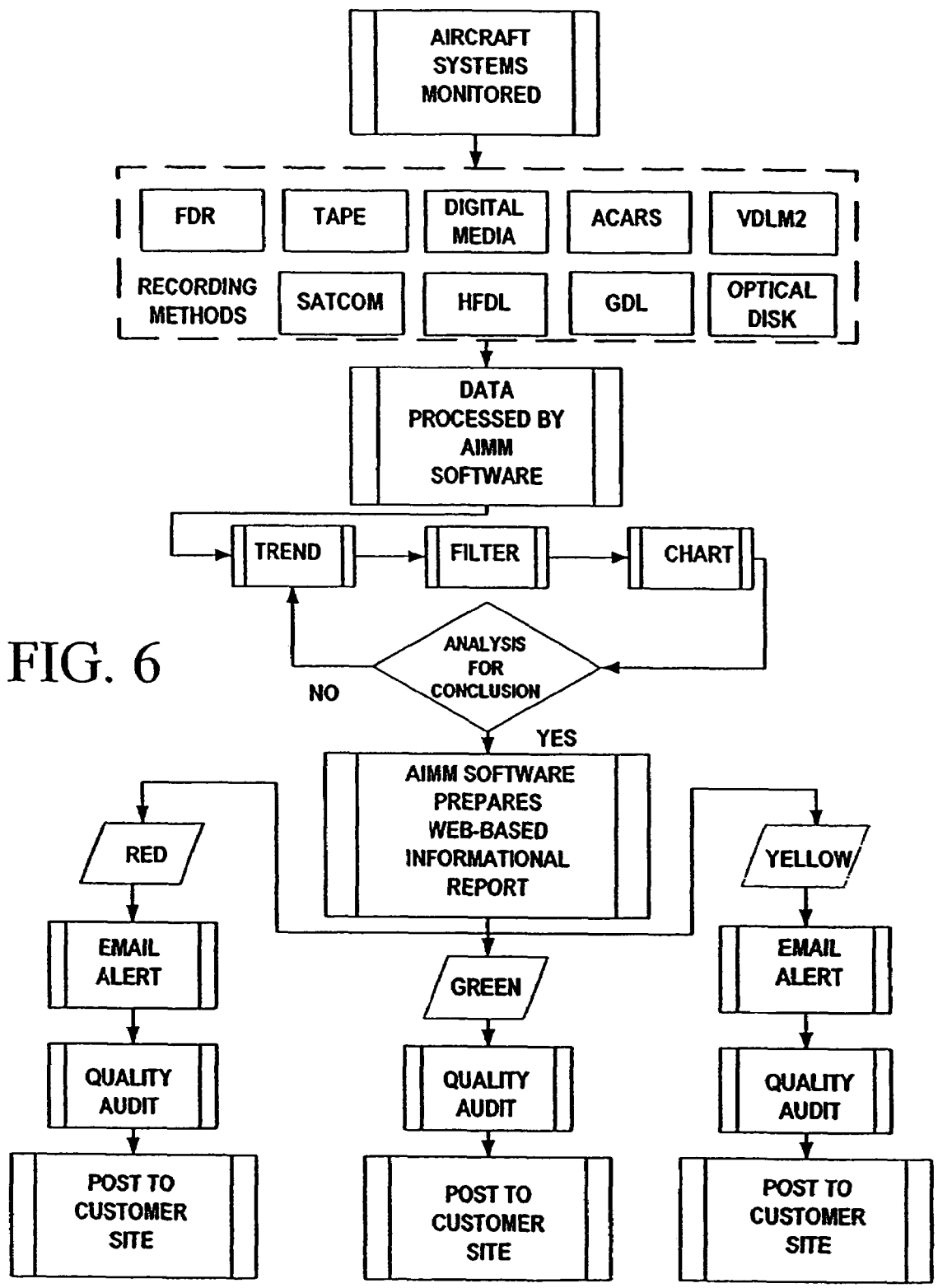
FIG. 6 shows an exemplary flow diagram of Aircraft Information Maintenance Management (AIMM) application software for use with the system of FIG. 5 according to one aspect of the present invention.

Referring to FIG. 6, an exemplary flow diagram of an Internet-enabled Aircraft Information Maintenance Management (AIMM) application software for use with the system 500 of FIG. 5 to analyze aircraft removal data for preventative maintenance over Internet 505 is illustrated according to one aspect of the present invention. In one embodiment, the AIMM application software acquires the aircraft removal data from multiple onboard sources and subsequently processes to selectively transform that aircraft removal data into graphical charts, trends, and filters.

Using the AIMM application software, technical expert personnel then analyze the aircraft removal data to identify maintenance-related symptoms to determine aircraft system operational information including failures, faults, and events. Such aircraft system operational information is utilized to provide proactive maintenance recommendations within an informational report presented as a customized customer informational report web page. The proactive maintenance recommendations within such an informational report may enable the customer such as aircraft operators to reduce unscheduled mechanical delays and cancellations, thereby reducing bottom line costs. The informational reports can be delivered periodically such as daily, weekly, or monthly.

As an example, to provide a periodic informational report regarding preventative maintenance, consider the actuation system of the Boeing 777 High Lift System (Flaps/Slats) as a project to analyze for a customer, e.g., an aircraft operator entity such as a "X Airlines." First, a project profile is created in the AIMM application software for the customer. The 629 BUS architecture and the Flap/Slat Electronics Units (FSEU) on the Boeing 777 collect aircraft removal data on an actuation rate. This aircraft removal data is then stored in a flight data acquisition system known as the Central Maintenance Computer (CMC). A server coupled to the AIMM application software may receive the aircraft removal data from "X Airlines" from their CMC's every other day on a fleet of 6 aircraft. The AIMM application software reads a dataset from the CMC that include the data fields for each of the 8 hydraulic actuators and their associated RVDT's & LVDT's sensors.

As a server reads the aircraft removal data, it transforms it into engineering units, by creating a unique dataset that comes across 100 data fields of data that are new to the AIMM application software for this project. The AIMM application software interactively communicates with one or more experts that are assigned to the project to ask whether the experts would like to add all the data fields to the project, and on what data fields the experts would like to set limits on. For example, an expert may choose to set the rate of movement on the 8 RVDT's at 10 degrees per second drawing from experience or from reading a system description document for this particular system provided by Boeing, Inc. of Seattle, Wash.

If the data in the selected data fields shows one or more occurrences indicating any time the rate of movement goes below 10 degrees per second, the AIMM application software will inform the expert with an automatic issuance a trigger having a visual and/or audible message. This may happen each and every time a new dataset is entered that has these data fields and dynamically as the AIMM application software parses the dataset into the data fields the first time. Then AIMM application software allows the expert to plot the data fields against any other field or time or even against a standard rate model trend line. Keeping track of triggers, the AIMM application software identifies form the dataset that a particular aircraft failed to maintain its extension rate 5 times within the last 4 flights.

Based on experience of the expert in dealing with this type of system or a prerecorded event, the AIMM application software knows that the flaps only extend twice in a flight. This means that the determined rate for the system failed to achieve its optimal performance 5 out of 8 times when it went to extend in the last 4 flights. Using this performance trending analysis of a maintenance condition, the expert using the AIMM application software may start the submittal of a status report for this system by categorizing this maintenance condition as a yellow alert for this particular aircraft as it doesn't warrant a red alert; since it just didn't move at the optimum rate.

Now, as part of the submittal the expert using the AIMM application software need to determine what is causing the problem, at least to at a preliminary level. However, the problem may be due to a part of another system, not the High Lift System. If the dataset includes any information on the valves or the central hydraulic system of the aircraft, then this data may be evaluated as above, by setting limits and processing the associated dataset.

This way, the expert using the AIMM application software will be able to narrow the problem down to maybe only a few components or the actual component causing the problem. Through the expert's experience in dealing with this system, the expert knows what part is causing the problem. For example, it could be a high lift system priority valve, which is shared, coincidentally, with the nose landing gear and is located in the nose gear well.

As a check, the expert using the AIMM application software examines the rate of nose gear extension in the dataset. As it should extend at 30 degrees per second, however, for the last 4 flights it has only been extending at a rate of 18 degrees per second. Also, knowing from experience, that the gears are given priority to the hydraulic system, and it was still not able to maintain its optimum rate, a maintenance-related conclusion may be accordingly drawn.

To this end, the expert using the AIMM application software then creates a report, which may include graphs, method flow charts, description, and some data in spreadsheet format. In this manner, the aircraft operator entity "X Airlines" may be timely and in real-time informed about the potential maintenance problem being with the valve and they can take certain measures for preventative maintenance.

Once submitted, the report goes to a management queue where one or more experts including technical professionals can review the contents and form of the report for clarity and completeness. Then the experts submit the report for posting to the "X Airlines" on "My X Airlines Site." In this example, the maintenance alert, because it is yellow, will trigger an automated email message to be sent to a contact person at "X Airlines" and to the contact person's pager, if desired. The AIMM application software does this automatically when it is a yellow or red status level. This avoids a failure in the examined system.

For example, a particular aircraft could be very close to a failure as to extend the flaps, not too mention it may have had a failure to extend the nose gear in the future also. The aircraft in such a condition cannot be dispatched without these functions. Moreover, it could be very dangerous if it failed while in a flight. As a result, a delay or even possibly a cancellation or in a worst case an incident/accident may be caused. However, the informational report with preventative and status information can avoid that delay or cancellation if the "X Airlines" act on the status report and catch the particular aircraft at its next down time.

In one embodiment, the AIMM application software provides virtual real-time posting via the World Wide Web. Once an expert using the AIMM application software analyzes the aircraft removal data, a customized customer informational report web page is created for the customer. In one embodiment, the customized customer informational report web page lists a system status for an aircraft system and descriptive information regarding various maintenance-related problems with the functionality of that aircraft system.

This customized customer informational report web page is then posted to an encrypted, secure web directory that only the customer can access. In addition, if a status is not "in-the-green" an automatic email alert is sent to the appropriate personnel in a technical expert group assigned to the customer. This provides for an immediate "heads-up" to go check their custom web site for preventative maintenance-related information.

FIG. 7 shows an exemplary customer informational report web page obtained from executing the AIMM application software of FIG. 6 on the system 500 of FIG. 5 to analyze aircraft removal data for preventative maintenance over Internet 505 in accordance with one aspect of the present invention. Other embodiments, variations, and improvements not described herein are not necessarily excluded from the scope of the invention, which is defined by the following claims.

Although the present invention and its advantages have been described in detail, it should be understood that various changes, substitutions and alterations can be made to the embodiments herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim:

1. A method, comprising:
   assessing aircraft operating data generated during operation of an aircraft, wherein said assessing is performed with respect to manufacturer-specified aircraft operating specifications;
   identifying a portion of said aircraft operating data corresponding to an aircraft system operating condition that deviates from at least one corresponding manufacturer-specified aircraft operating specification; and
   determining at least one of a severity level of the aircraft system operating condition with respect to a plurality of possible aircraft system operating condition severity levels and an analytical characterization of the aircraft system operating condition.

2. The method of claim 1 wherein:
   said determining the analytical characterization of the aircraft system operating condition includes determining a performance trend for the aircraft system operating condition; and
   the performance trend provides indication of a potential need for implementing a corrective action to address the aircraft system operating condition.

3. The method of claim 2, further comprising:
   providing at least one of the performance trend and the aircraft system operating condition for enabling assessment of a potential need for implementing the corrective action to address the aircraft system operating condition, wherein said providing includes at least one of highlighting, displaying, outputting and reporting.

4. The method of claim 2 wherein determining the severity level of the aircraft system operating condition includes determining a color-coded indicator of the severity level of the aircraft system operating condition with respect to a degree of deviation from said at least one corresponding manufacturer-specified aircraft operating specification.

5. The method of claim 4 wherein determining the severity level of the aircraft system operating condition includes one of:
   categorizing the aircraft system operating condition as having a first status level associated with a first color-coded indicator of the severity level of the aircraft system operating condition;
   categorizing the aircraft system operating condition as having a second status level associated with a second color-coded indicator of the severity level of the aircraft system operating condition; and
   categorizing the aircraft system operating condition as having a third status level associated with a third color-coded indicator of the severity level of the aircraft system operating condition.

6. An aircraft flight analysis and safety computer program, comprising
   computer readable program instructions configured for performing the steps of: assessing aircraft system operating conditions with respect to corresponding manufacturer-specified aircraft operating specifications;
   determining a performance trend for an aircraft system operating condition that deviates from at least one corresponding manufacturer-specified aircraft operating specification, wherein the performance trend provides indication of a potential need for implementing a corrective action to address the aircraft system operating condition; and
   providing at least one of the performance trend and the aircraft system operating condition for enabling assessment of the potential need for implementing the corrective action to address the aircraft system operating condition.

7. The aircraft flight analysis and safety computer program of claim 6 wherein said providing includes at least one of highlighting, displaying, outputting and reporting.

8. The aircraft flight analysis and safety computer program of claim 6, further comprising:
   determining a severity level of the aircraft system operating condition with respect to a plurality of possible aircraft system operating condition severity levels, wherein determining the severity level of the aircraft system operating condition includes determining a color-coded indicator of the severity level of the aircraft system operating condition with respect to a degree of deviation from said at least one corresponding manufacturer-specified aircraft operating specification.

9. The aircraft flight analysis and safety computer program of claim 8 wherein determining the severity level of the aircraft system operating condition includes one of:
   categorizing the aircraft system operating condition as having a first status level associated with a first color-coded indicator of the severity level of the aircraft system operating condition;
   categorizing the aircraft system operating condition as having a second status level associated with a second color-coded indicator of the severity level of the aircraft system operating condition; and
   categorizing the aircraft system operating condition as having a third status level associated with a third color-coded indicator of the severity level of the aircraft system operating condition.

10. An aircraft flight analysis and safety system, comprising:
    at least one computer including memory; and
    a computer program stored in said memory, wherein the computer program includes instructions readable by said at least one computer and wherein said instructions are configured for:
    assessing aircraft system operating conditions with respect to corresponding manufacturer-specified aircraft operating specifications;
    determining a performance trend for an aircraft system operating condition that deviates from at least one corresponding manufacturer-specified aircraft operating specification, wherein the performance trend provides indication of a potential need for implementing a corrective action to address the aircraft system operating condition; and
    providing at least one of the performance trend and the aircraft system operating condition for enabling assessment of the potential need for implementing the corrective action, wherein said providing includes at least one of highlighting, displaying, outputting and reporting.

11. The aircraft flight analysis and safety system of claim 10 wherein:
    instructions are configured for determining a severity level of the aircraft system operating condition with respect to a plurality of possible aircraft system operating condition severity levels; and determining the severity level of the aircraft system operating condition includes determining a color-coded indicator of the severity level of the aircraft system operating condition with respect to a degree of deviation from said at least one corresponding manufacturer-specified aircraft operating specification.

12. A method, comprising:

retrieving aircraft operating data from an aircraft;

assessing said aircraft operating data with respect to manufacturer-specified aircraft operating specifications;

identifying a portion of said aircraft operating data corresponding to an aircraft system operating condition that deviates from at least one corresponding manufacturer-specified aircraft operating specification; and determining at least one of a severity level of the aircraft system operating condition with respect to a plurality of possible aircraft system operating condition severity levels and an analytical characterization of the aircraft system operating condition.

13. The method of claim 12 wherein:

said determining the analytical characterization of the aircraft system operating condition includes determining a performance trend for the aircraft system operating condition; and the performance trend provides indication of a potential need for implementing a corrective action on the aircraft system component to address the aircraft system operating condition.

14. The method of claim 13, further comprising:

providing at least one of the performance trend and the aircraft system operating condition for enabling assessment of a potential need for implementing the corrective action to address the aircraft system operating condition, wherein said providing includes at least one of highlighting, displaying, outputting and reporting.

15. The method of claim 13 wherein determining the severity level of the aircraft system operating condition includes determining a color-coded indicator of the severity level of the aircraft system operating condition with respect to a degree of deviation from said at least one corresponding manufacturer-specified aircraft operating specification.

16. A system, comprising:

an aircraft including a flight data recording system;

at least one computer having memory and configured for being interfaced with the flight data recording system to enable aircraft operating data to be acquired from the flight data recording system; and a computer program stored in said memory, wherein the computer program includes instructions readable by said at least one computer and wherein said instructions are configured for:

assessing aircraft system operating conditions with respect to corresponding manufacturer-specified aircraft operating specifications, wherein said aircraft system operating conditions relate to respective portions of said aircraft operating data;

determining a performance trend for an aircraft system operating condition that deviates from at least one corresponding manufacturer-specified aircraft operating specification, wherein the performance trend provides indication of a potential need for implementing a corrective action to address the aircraft system operating condition; and providing at least one of the performance trend and the aircraft system operating condition for enabling assessment of the potential need for implementing the corrective action, wherein said providing includes at least one of highlighting, displaying, outputting and reporting.

17. The system of claim 16 wherein:

said instructions are configured for determining a severity level of the aircraft system operating condition with respect to a plurality of possible aircraft system operating condition severity levels; and determining the severity level of the aircraft system operating condition includes determining a color-coded indicator of the severity level of the aircraft system operating condition with respect to a degree of deviation from said at least one corresponding manufacturer-specified aircraft operating specification.

* * * * *

UNITED STATES PATENT AND TRADEMARK OFFICE
CERTIFICATE OF CORRECTION

PATENT NO. : 7,359,777 B2  
APPLICATION NO. : 11/136072  
DATED : April 15, 2008  
INVENTOR(S) : W. Bradley Betters et al.

Page 1 of 1

It is certified that error appears in the above-identified patent and that said Letters Patent is hereby corrected as shown below:

Title Page; item (60);

Insert the following continuity language into the face of the patent:

--Related U.S. Application Data
Continuation of application No. 10/838,042, filed May 3, 2004, now patent No. 6,959,236, which is a continuation of application No. 10/437,810, filed May 14, 2003, now patent No. 6,732,027, which is a continuation of application No. 09/821,842, filed March 28, 2001, now patent No. 6,567,729.--

Insert the following continuity language into the specification, at column 1, immediately below the title; line 4;

--This is a continuation of, and claims priority to application No. 10/838,042, filed May 3, 2004, now patent No. 6,959,236, which is a continuation of application No. 10/437,810, filed May 14, 2003, now patent No. 6,732,027, which is a continuation of application 09/821,842, filed March 28, 2001, now patent No. 6,567,729.--

Signed and Sealed this
Fourth Day of January, 2011

David J. Kappos
*Director of the United States Patent and Trademark Office*